Aug. 18, 1953 — T. SATO — 2,649,320
ANGLE POST SPLICING COLLAR
Filed April 29, 1949 — 2 Sheets-Sheet 1

INVENTOR.
Takeo Sato
BY *Victor J. Evans & Co.*
ATTORNEYS

Aug. 18, 1953 T. SATO 2,649,320
ANGLE POST SPLICING COLLAR
Filed April 29, 1949 2 Sheets-Sheet 2

INVENTOR.
Takeo Sato
BY Victor J. Evans & Co.
ATTORNEYS

Patented Aug. 18, 1953

2,649,320

UNITED STATES PATENT OFFICE 2,649,320

ANGLE POST SPLICING COLLAR

Takeo Sato, Honolulu, Territory of Hawaii

Application April 29, 1949, Serial No. 90,379

1 Claim. (Cl. 287—104)

This invention relates to supporting posts used in shoring reinforced concrete form work, and in particular a clamp or collar positioned around overlapping angles of an angle post with set screws therein for locking the angles of the post in the collar whereby the length of the post is adjustable.

The purpose of this invention is to provide a splicing collar for posts formed of oppositely positioned angles whereby the posts may readily be extended or contracted and the elements thereof removably held in adjusted positions.

In the usual method of adjusting the length of posts of this type tapered pins are driven into holes extended through the elements of the posts and by this means the pins are the only holding elements so that the angles are not clamped together. Angular elements of this type are difficult to hold because of the irregular or uneven outer surfaces. With this thought in mind this invention contemplates a special collar having vertically disposed slots extended therethrough with the slots shaped to receive oppositely positioned angles particularly of an angle post.

The object of this invention is, therefore, to provide means for constructing a splicing collar for angle posts in which the collar may readily be slid over the ends of the angles of the posts and in which angles for extending the length of the post may be inserted in and also clamped in the collar.

Another object of the invention is to provide a splicing collar for posts formed with oppositely positioned angles in which the angles are not only clamped in the collar but are positively held by set screws with extended ends positioned in openings in legs of the angles.

A further object of the invention is to provide a splicing collar for adjustably securing sections of angle posts together which is of a simple and economical construction.

With these and other objects in view the invention embodies a collar having perpendicularly disposed slots extended therethrough with longitudinally and laterally disposed extensions enclosing the ends of the slots and with set screws threaded in the sections and provided with ends extended into the said slots.

Other features and advantages of the invention will appear from the following description taken in connection with the drawings wherein.

Figure 1:
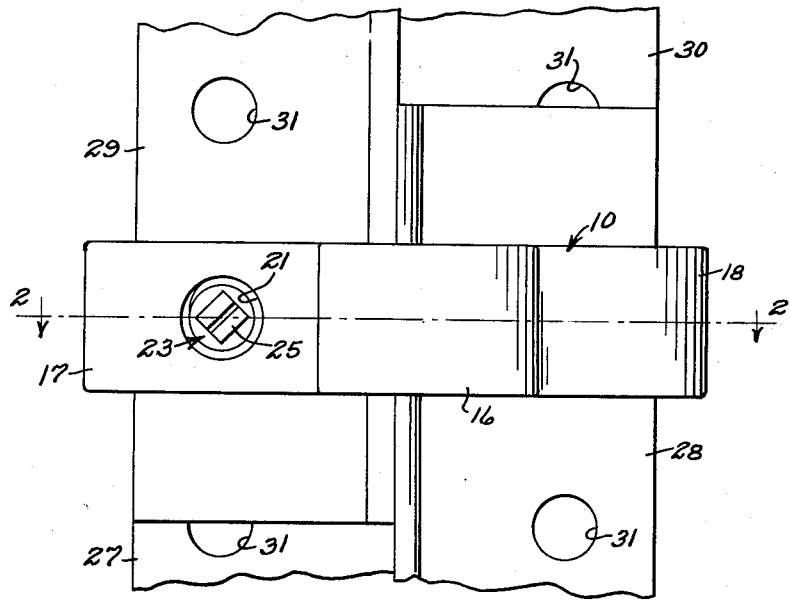
Figure 1 is a side elevational view of an angle post splicing collar with part of an angle post extended therethrough and with parts of the angles of the posts broken away.

Referring now to the drawings therein like reference characters denote corresponding parts. A splicing collar 10 of this invention is formed with radially disposed slots 11, 12, 13 and 14 with the slots 13 and 14 perpendicular to the slots 11 and 12.

The sides of the collar in which the ends of the slots are positioned are formed with bulging or extended sections 15, 16, 17 and 18 and each of these sections is formed with a thick and a thin wall with the thick walls provided with threaded sockets 19, 20, 21, and 22 respectively in which set screws 23 with extended inner ends 24 and heads 25 with screw driver slots 26 therein are positioned.

Figure 2:
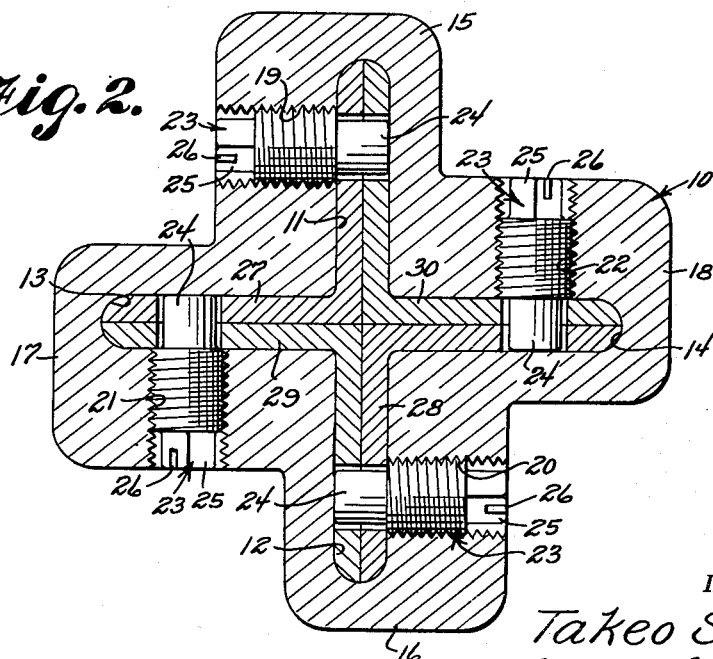
Figure 2 is a sectional plan through the collar taken on line 2—2 of Figure 1 and illustrating a collar for splicing sections of angle posts including oppositely positioned angles.

In this design the lower section of the post is provided with oppositely positioned angles 27 and 28 and the upper section is formed with correspondingly positioned angles 29 and 30. The legs or flanges of the angles are provided with bolt receiving holes 31 and with the bolt holes in registering positions extended ends 24 of the set screws are positioned therein, as shown in Figure 2. The slots are formed to receive two of the legs of angles and with one section of the posts slid over the other and with the angles of both sections of the posts extended through the collar the set screws are screwed inwardly positively securing the two sections of the post together.

Figure 3:
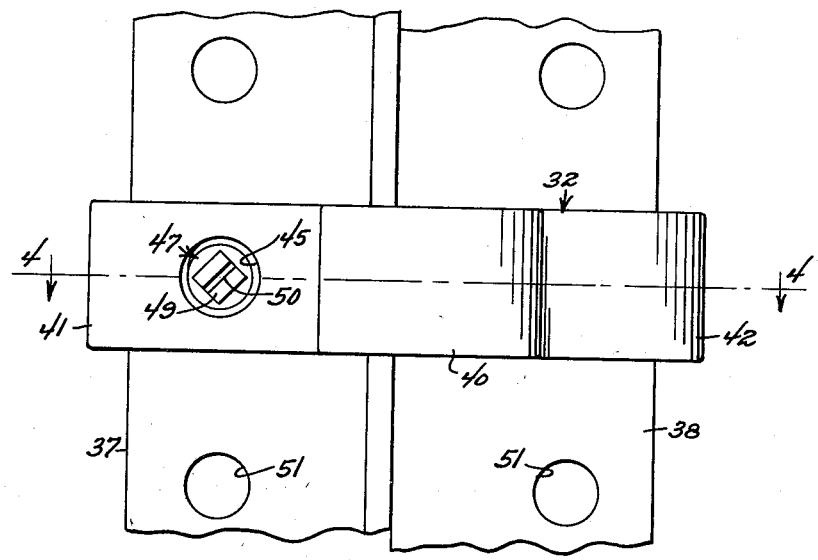
Figure 3 is a side elevational view similar to that shown in Figure 1 showing a modification wherein a collar is provided for splicing single angle sections of angle posts, and which may also be used at spaced intervals on the sections of the post illustrated in Figures 1 and 2 for preventing spreading of the angles and thereby reinforcing the sections of the post.
Figure 4:
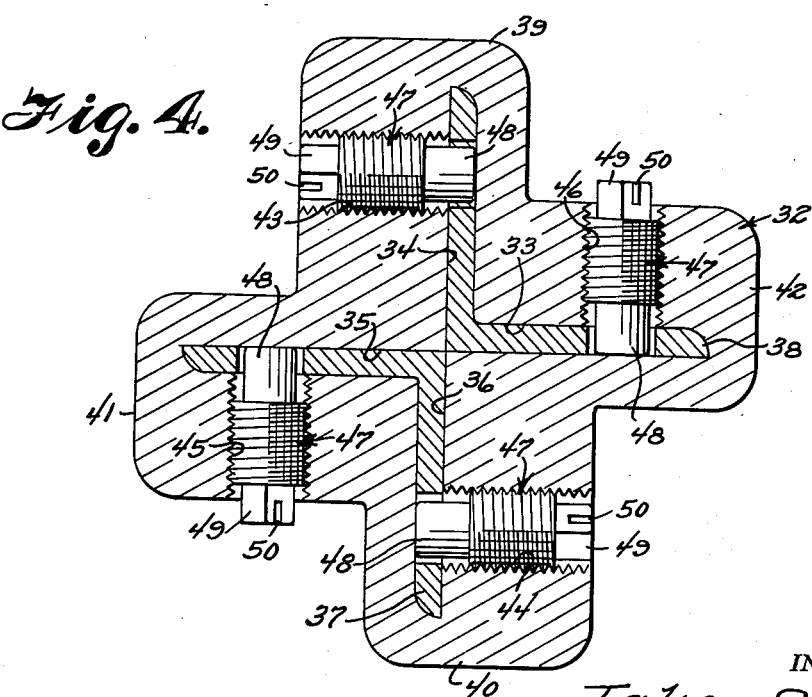
Figure 4 is a cross section through the collar shown in Figure 3 taken on line 4—4 thereof.

In the design illustrated in Figures 3 and 4 a collar 32 is formed with right angularly disposed slots 33 and 34 and oppositely positioned right angularly disposed slots 35 and 36 whereby the collar may be used for splicing single angle posts that may be formed with angles 37 and 38 or the collar may be slid over the angles of the lower or upper sections of the post shown in Figures 1 and 2 to reinforce the angles of the posts by preventing spreading thereof.

In the collar of this design the body portion is formed with extensions 39, 40, 41 and 42, and the extensions, which are formed with thick and thin walls are provided with threaded sockets 43, 44, 45 and 46, respectively, and set screws 47 with extending ends 48 and heads 49 having screw driver slots 50 therein are threaded in the sockets whereby the extended ends may extend into openings 51 of the angles.

The splicing collars of this design may, therefore, be used for stiffening the angle posts as illustrated in Figures 1 and 2, or they may also be used for splicing angle posts formed with single angles.

The splicing collars of this invention may be slid over the end of one section of an angle post and the end of another section of the post may be slid into the collar as illustrated in the drawings, and with the set screws screwed into the openings or bolt holes of the angles the sections of the posts will be rigidly secured together. The splice may be formed with one collar or where the overlapping ends of the posts are extended several collars may be used to complete the splice.

It will be understood that modifications may be made in the design and arrangement of the parts without departing from the spirit of the invention.

What is claimed is:

In a splicing collar, the combination which comprises a block of material having L-shaped slots with right angularly positioned legs extended therethrough, said slots being perpendicular to spaced faces of the block, one of the walls of each of said slots being positioned in one of two right angularly positioned and crossed planes and each of said walls meeting at a common point, the other wall of each of said slots being spaced from and parallel to the walls in the crossed planes, said block having sections extended around the extended ends of each of said slots, and set screws threaded in each of the extended sections of the block and positioned whereby the ends thereof are adapted to extend through parts of structural elements extended through said slots.

TAKEO SATO.

References Cited in the file of this patent

UNITED STATES PATENTS

| Number | Name | Date |
|---|---|---|
| 99,508 | Williams | Feb. 1, 1870 |
| 332,673 | Munson | Dec. 15, 1885 |
| 373,407 | Kress | Nov. 15, 1887 |
| 395,399 | Mast | Jan. 1, 1889 |
| 404,788 | Kelly | June 4, 1889 |
| 433,459 | Ferrell | Aug. 5, 1890 |
| 1,096,462 | Russell | May 12, 1914 |

FOREIGN PATENTS

| Number | Country | Date |
|---|---|---|
| 9,852 | Norway | Aug. 26, 1901 |
| 13,233 | Germany | Apr. 12, 1881 |